Jan. 27, 1959     E. PORTENIER ET AL     2,871,372
INFRARED IMAGE CONVERTER APPARATUS

Filed Dec. 16, 1954     2 Sheets-Sheet 1

INVENTORS
ERNST PORTENIER
WILHELM SPINNLER
ERROL BOLAY
HANS RIOLO

BY
AGENT

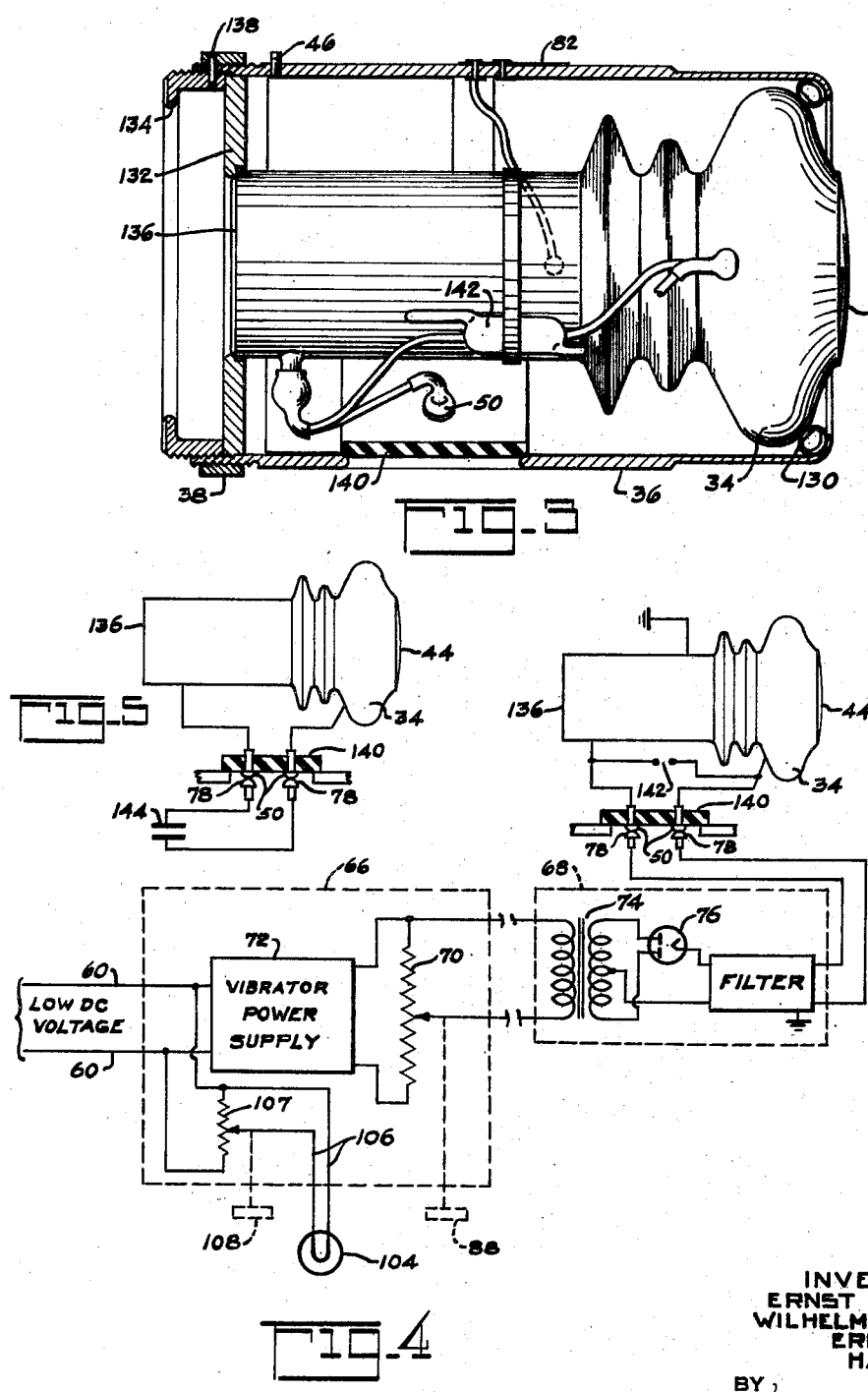

United States Patent Office 2,871,372
Patented Jan. 27, 1959

2,871,372

INFRARED IMAGE CONVERTER APPARATUS

Ernst Portenier, Kuesnacht, Wilhelm Spinnler, Schachen Bonstetten, Errol Bolay, Uitikon, and Hans Riolo, Wettingenaargau, Switzerland, assignors to Albiswerk Zuerich A. G., Zurich, Switzerland, a Swiss company Application December 16, 1954, Serial No. 475,741

6 Claims. (Cl. 250—239)

This invention relates to infrared rays and is particularly directed to infrared image converter apparatus.

Invisible infrered rays are used for driving at night or with zero visibility. Invisible infrared rays are emitted over the terrain under observation by a special projector. Upon reflection from the terrain the rays are received by an apparatus, the main component of which is a picture forming tube. This picture forming tube is an electronic tube which converts the received invisible infrared rays into a visible picture.

The present invention comprises the provision of a novel infrared image converter apparatus. An infrared image converter apparatus made in accordance with the invention has an objective, a picture forming tube, an occular or eye piece, an electrical supply unit and additional equipment with the various parts being fitted together into a single unit so that they are individually interchangeable.

Other objects of the invention will become apparent upon reading the annexed detailed description in connection with the drawing in which:

Fig. 3 is an axial sectional view of the picture tube cartridge;

Fig. 4 is a schematic wiring diagram of the apparatus; and

Fig. 5 is a schematic view illustrating a modification.

Figure 1:
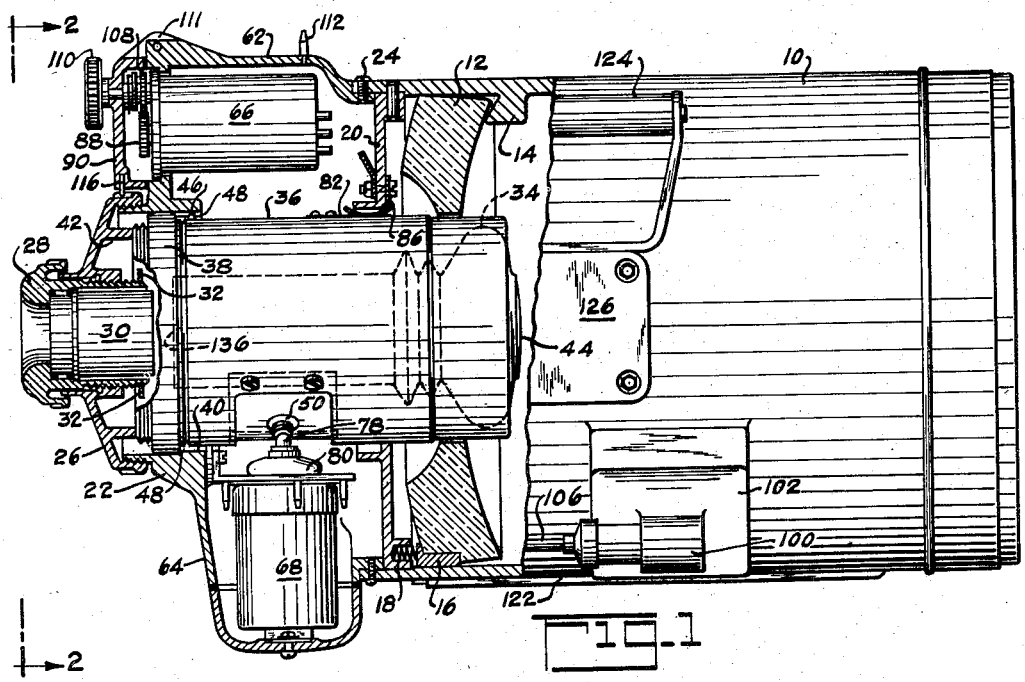
Fig. 1 is a side view, partly in section, of an infrared image converter apparatus embodying the invention.

Referring to the drawing, the infrared image converter apparatus comprises a housing 10 having an optical objective of which only an annular mirror 12 is illustrated (Fig. 1). In order to position the mirror 12, it is pressed against a plurality of circumferentially-spaced lugs 14 by a plurality of circumferentially-spaced slidable elements 16 and springs 18. Preferably there are three springs 18 and associated slidable elements 16. A wall or partition 20 closes the inner end of the objective housing.

A funnel-shaped housing part 22 is secured by screws 24 to the end of the objective housing 10 adjacent to the mirror 12. An annular plate 26 is screwed onto the smaller end of the funnel-shaped part 22 and the occular or eye piece casing 28 is screwed onto the plate 26 to permit axial adjustment of the eye piece lens system 30. A lock ring 32 on the eye piece casing 28 prevents complete removal of the eye piece casing.

The picture forming tube 34 of the apparatus is inserted into a tubular casing 36 to form a cartridge which thereby is replaceable as a unit. This cartridge includes a stop ring position determining member 38 which is threaded on the cartridge tubular casing 36. The picture tube cartridge is placed in the apparatus so that the cartridge is supported by the wall 20 and the funnel-shaped housing part 22 with the front end of the picture tube extending through the mirror 12 and the stop ring 38 engaging a shoulder stop portion 40 on the housing part 22. An annular rib 42 on the plate 26 presses against the eye piece end of the picture tube cartridge to hold the stop ring 38 against the shoulder 40. The stop ring 38 is so positioned on the cartridge that the photo-sensitive cathode 44 of the picture tube is properly positioned optically relative to the objective of the apparatus. The picture tube cartridge also includes two pins or keys 46 (only one of which is illustrated) which project radially from the cartridge tubular casing 36 into axial grooves or keyways 48 in the shoulder 40 to rotatively position the cartridge.

The optical data (focal distance and visibility angle) depend on the construction of the apparatus and determine the type of picture tube used. The cartridge of each tube type is formed with its two pins 46 disposed at a specific angle and the two axial grooves 48 of the apparatus are formed at a specific angle corresponding to the angle between the pins 46 of the picture tube cartridge for that apparatus. In this way only the right picture tube cartridge can be installed in the apparatus.

As hereinafter more fully described the picture tube cartridge also has contact terminals 50 electrically connected to the picture tube.

A cable 60 connects the apparatus to a source of relatively low direct current (D. C.) voltage as for example a storage battery. The electric supply means providing the various operational voltages of the picture tube are installed in the image converter apparatus. For this purpose the funnel-shaped housing part 22 is provided with two projecting pockets 62 and 64 in which the low voltage unit 66 and the high voltage unit 68, respectively, are mounted.

The cable 60 leads to the low voltage unit 66. This latter unit includes a regulating resistance 70 and an interrupter or vibrator 72. The vibrator changes D. C. currents into alternating currents (A. C.) of the same low voltage. The low voltage A. C. currents are connected to a transformer 74 of the high voltage unit 68. From here the high voltage current is rectified by a double diode 76 and suitable filter means. This provides a ground pole and two opposed poles which are connected to two electric contact terminals 78 on an insulator member 80 supported in the housing pocket 64 so as to engage the picture tube cartridge contacts 50.

The contact terminals 50 and 78 are disposed so that the lowest or negative potential is connected to the tube cathode 44 and the highest potential to the second electron acceleration electrode of the tube and to the fluorescent screen of the tube. The first acceleration electrode of the tube is connected to contact 82 which is engaged by a grounded spring 86 to insure a good ground contact for the tube.

The voltages of the two acceleration electrodes and cathode of the tube must be in proper proportion for sharp focusing of the optical system of the tube. This proportion depends on the particular tube used. The previously mentioned regulating resistance 70 is provided for sharp focusing of the picture tube. For this purpose the resistance 70 is adjustable by a knurled knob 88 which is accessible when the cover 90 for the pocket 62 is open.

The optical setting of the optical objective is accomplished by a knob 94 whereby the objective can be adjusted in accordance with the distance to the object to be viewed. A mirror (not shown) of the optical objective is connected to the knob 94 for axial adjustment by said knob.

An auxiliary device includes a housing unit 100 mounted on a supporting cover 102 on the objective housing 10. A filament lamp 104 is disposed in the unit 100, said lamp radiating light through a calibrated plate in the cover 102. This plate is formed with cross hair slots through which light is projected into the ray path of the objective and thereby projected onto the photosensitive cathode 44. A cable 106 supplies the filament lamp 104 with D. C. current from the low voltage unit 66 through a variable resistance 107. The resistance 107 is adjustable by a knurled knob 108 when the cover 90 for the pocket 64 is open. In addition a knob 110 is coupled to the knob 108 when the cover 90 is closed for adjusting the resistance 107. Adjustment of the resistance 107 controls the brightness of the lamp 104. A sighting device 111 and front sight 112 are used for coarser orientation of the apparatus.

Figure 2:
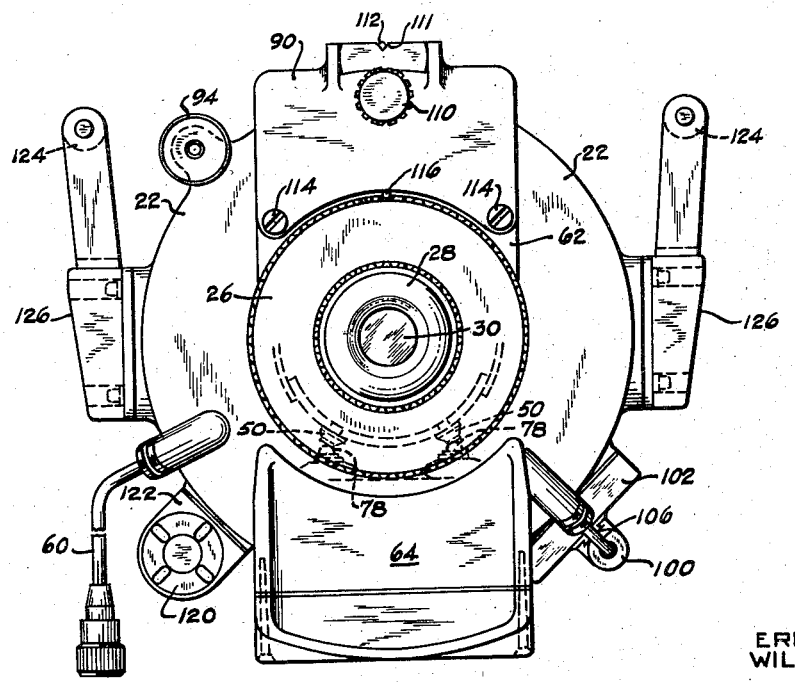
Fig. 2 is a front end view of the apparatus of Fig. 1.

The cover 90 can be opened after loosening both screws 114. The low voltage unit 66 can then be removed as a unit. Also with the cover 90 open the plate 26 can be unscrewed and the picture tube cartridge replaced. As illustrated in Figs. 1 and 2 the cover 90 has a pin 116 which engages in grooves formed about the periphery of the plate 26 to lock the plate in position when the cover 90 is closed.

A screw cover 120 closes a passage 122 leading into the interior of the apparatus. This passage contains a replaceable porous container within which a moisture absorbing material is disposed. This material absorbs moisture from within the housing thereby eliminating moisture condensation on the optical surfaces.

Handles 124 are provided to facilitate lifting the apparatus and supports 126 serve as mounting surfaces for supporting the apparatus on a suitable mount which preferably is horizontally and vertically adjustable.

The picture tube cartridge is best seen in Fig. 3. At the right end the tubular casing 36 is flanged and a rubber ring 130 is disposed in the annular groove formed by said flange to support the adjacent end of the picture tube 34. The photo-sensitive cathode 44 protrudes from the tubular casing 36. The other end of the tube 34 is centered by an annular plate 132 which is pressed axially against the tube by a ring 134 screwed into the tubular casing 36. In this way the picture tube is pressed against the rubber ring 130. The plate 132 is annular so that the fluorescent screen 136 of the tube is visible therethrough and can be viewed through the eye piece 28.

When assembling the picture tube cartridge, the ring 134 is tightened and the stop ring 38 is screwed to its proper position as previously mentioned. The ring 134 and stop ring 38 are then locked in position to the tubular casing 36 by a pin 138. An insulation plate 140 is mounted over an opening in the cartridge casing 36 and the previously mentioned contact terminals 50 are mounted on this plate. Wires inside the cartridge casing 36 connect the contacts 50 and ground contact 82 to the tube as previously described. With this construction, the picture tube is mechanically and firmly held in position whereby the parts can withstand high contact pressure. The prior art construction in which metal discs were joined to glass supports of the tube created large mechanical stresses in the joints.

The cartridge casing 36 can be made of non-conductive material. However, through proper choice of metal for the casing 36, the electrode system of the picture tube 34 can be effectively shielded against external magnetic and electrical fields.

An overvoltage discharge tube 142 is connected across the terminals of the tube 34 to protect the tube against a possible high voltage discharge. Since the picture tube 34 is supplied with very high D. C. voltage with very little current it is necessary that all electric supply lines be properly insulated. With the construction of the present invention all high voltage lines are disposed in the apparatus and they are of short and fixed length. With the prior art construction the high D. C. voltage is fed to the apparatus through a cable from a separate electrical supply source with the result that variations in cable lengths and other conditions necessarily cause voltage changes at the tube.

With the present invention it is also possible to use a pre-charged condenser with high insulation resistance for the picture tube high voltage supply. Such a variation is schematically illustrated in Fig. 5. As there illustrated, a condenser 144 is connected to the contact terminals 78 in place of the high voltage unit 68. Thus the condenser 144 could be mounted in the pocket 64 in place of the high voltage unit 68. With this arrangement the picture tube no longer depends on an external electric supply source whereby neither the low voltage unit 66 or the high voltage unit 68 are then necessary for operation of the picture tube. Because of the low current consumption of the picture tube 34 and its good insulation characteristics continuous operation of the tube over a substantial period is possible with the condenser 144.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications.

We claim as our invention:

1. In an infrared image converter apparatus, in combination, a housing having at least one keyway and a stop member; a cartridge removably mounted within said housing, said cartridge comprising a casing and an infrared image converter tube mounted therein, a position determining member arranged on said cartridge and adapted to engage said stop member in said housing for axial positioning of said cartridge; a key member arranged on said cartridge and adapted to engage said keyway in said housing; a source of operating potential mounted within said housing; first electric contacts in said housing connected to said potential source; and second electric contacts on said cartridge connected to said tube, said first and second contacts being adapted to engage upon the respective engagement of said position determining and said stop members and said key and keyway.

2. Infrared image converter apparatus as recited in claim 1 in which said source of operating potential includes vibrator means for converting first direct current to alternating current, a transformer for increasing the voltage of said alternating current, and rectifier means for converting said increased alternating current voltage to direct current voltage of larger magnitude than said first direct current.

3. Infrared image converter apparatus as recited in claim 1 in which said source of operating potential includes a pre-charged condenser for supplying the required direct current voltage required.

4. In an infrared image converter apparatus, in combination, a housing having spaced end walls and having a stop member spaced from said end walls, said housing also having at least one keyway; a cartridge removably mounted in said housing, said cartridge including a casing and an infrared image converter tube mounted therein; a position determining member arranged on said cartridge and adapted to engage said stop member of said housing for axial positioning of said cartridge; and a key member arranged on said cartridge and adapted to engage said keyway in said housing when said cartridge is mounted in said housing, whereby the respective engagements of said position determining member with said stop member and with said key member with said keyway accurately position said cartridge at a preselected position in said housing.

5. In an infrared image converter apparatus, in combination, a housing having spaced end walls and having a stop member spaced from said end walls, said housing also having at least one keyway; a cartridge removably mounted in said housing, said cartridge including a casing and an infrared image converter tube mounted therein; a position determining member arranged on said cartridge and adapted to engage said stop member of said housing for axial positioning of said cartridge, said position determining member being axially adjustable along said cartridge so that the preselected axial position of said cartridge in said housing can be changed whenever desired; and a key member arranged on said cartridge and adapted to engage said keyway in said housing when said cartridge is mounted in said housing, whereby the respective engagements of said position determining member with said stop member and with said key member with said keyway accurately position said cartridge at a preselected position in said housing.

6. In an infrared image converter apparatus, in combination, a housing having spaced end walls and having a stop member spaced from said end walls, said housing also having at least one keyway; a cartridge removably mounted in said housing, said cartridge including a casing and an infrared image converter tube mounted therein; a position determining member arranged on said cartridge and adapted to engage said stop member of said housing for axial positioning of said cartridge; a key member arranged on said cartridge and adapted to engage said keyway in said housing when said cartridge is mounted in said housing, whereby the respective engagements of said position determining member with said stop member and with said key member with said keyway accurately position said cartridge at a preselected position in said housing, and an ocular unit adapted to be mounted on said housing in such manner that the respective positions between said ocular unit and said image converter tube can be positioned in any one of a plurality of preselected positions, whenever desired.

References Cited in the file of this patent

UNITED STATES PATENTS

| | | |
|---|---|---|
| 2,058,941 | Arnhym | Oct. 27, 1936 |
| 2,491,192 | Martin et al. | Dec. 13, 1949 |
| 2,680,817 | Haynes | June 8, 1954 |
| 2,683,816 | Bouywers | July 13, 1954 |
| 2,692,300 | Hogan | Oct. 19, 1954 |

FOREIGN PATENTS

| | | |
|---|---|---|
| 717,860 | Great Britain | Nov. 3, 1954 |
| 1,068,703 | France | Feb. 10, 1954 |